United States Patent Office 2,721,830
Patented Oct. 25, 1955

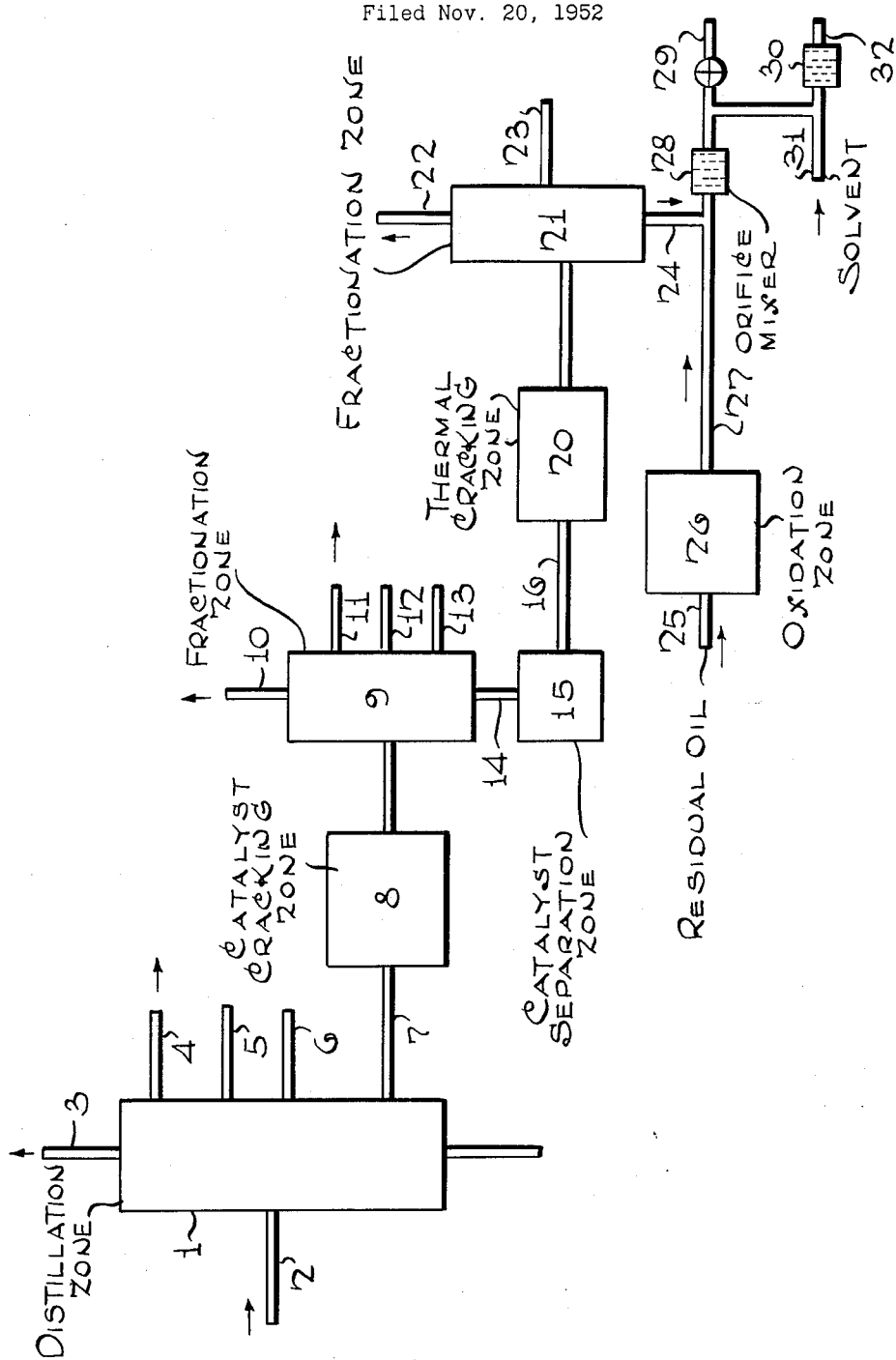

2,721,830

NOVEL ASPHALT PROCESS AND COMPOSITION

Murray H. Edson, Rahway, N. J., and Anthony J. Di Gennaro, Baltimore, Md., assignors to Esso Research and Engineering Company, a corporation of Delaware Application November 20, 1952, Serial No. 321,602

6 Claims. (Cl. 196—22)

This invention concerns a new and improved form of asphalt and the invention includes the steps or process for manufacturing this asphalt. In the preferred form of this invention the process is conducted to provide improved cutback asphalts, particularly desirable in substantially eliminating the problem of high viscosity increase and gelation of cutback asphalts stored in closed containers.

In the field of asphalt compositions, cutback asphalts find wide applications. Essentially, a cutback asphalt constitutes a mixture of an asphalt of desirable melting point and physical properties with a volatile solvent. Such a mixture is ordinarily fluid at ambient temperatures, facilitating cold application. On evaporation of the solvent, the asphalt is left as a residue to serve the required function. Cutback asphalts are attractive for use in undercoating automobiles, in paints, for road paving, etc. For many of these applications it becomes highly desirable to prepare cutback asphalts from asphalts having a high melting or softening point. As is well known, high softening point asphalts are advantageously obtained by the oxidation of residual oils. Blowing air through a residual oil serves to raise the melting point of the oil to provide asphalts having softening points as high as or higher than 160° F. However, in preparing cutback asphalts from oxidized asphalts of this character, it has been found that gelling problems are encountered. By definition, the term "gelling" is employed to indicate an excessive increase in the viscosity of the asphalt over a period of time. Gelling is also referred to as a tendency to "liver" in storage. In its most aggravated form, gelation is encountered which, over a period of time, converts a cutback asphalt to a semi-solid, thioxotropic, gel form.

It is one of the purposes of this invention therefore, to provide a process for obtaining a cutback asphalt, prepared from an oxidized asphalt, which is not subject to gelation. This is achieved by blending a particular type of tar material with an oxidized asphalt. The tar to be employed is the bottoms of a thermally cracked oil which has been subjected to prior catalytic cracking. The process combination of catalytic cracking, followed by thermal cracking, apparently serves to provide asphaltic blending agents which inhibit or prevent gelling of oxidized asphalts.

The compositions of this invention embrace a two-component mixture of an oxidized asphalt and a thermally cracked tar, obtained by the thermal cracking of a heavy boiling catalytically cracked feed stock. The oxidized asphalts to be employed in this composition are asphalts derived from the air-blowing or oxidation of residual oils characterized by a softening point above about 160° F. As used here and throughout this description, the term "residual oil" is used to define the residue obtained from the destructive distillation of non-asphaltic petroleum or the distillation of semi-asphaltic and asphaltic petroleums. By incorporating up to about 50% of the tar material, obtained as indicated previously, with oxidized asphalts of this character, desirable asphalt compositions are obtained. These two-component blends are desirable for many applications as such. This mixture is characterized by considering its physical properties for a particular asphalt grade. For example, the softening point and penetration values of the mixture normally lie between the numbers shown in the following table for each particular grade. Although these are most common, it is not unusual to find higher or lower penetration values at given softening points.

| Softening Point Grade | 160–180 | 180–200 | 200–235 | 235–250 |
|---|---|---|---|---|
| Penetration, 77°/100 g./5" | 30–40 | 20–30 | 10–20 | 5–10 |
| Penetration, 32°/200 g./60" | 15–30 | 10–20 | 7–15 | 1–8 |

The properties of the finished asphalt blend depend upon the quantity of tar in the blend and the initial quality of the base asphalt. Normally, the softening point of the base asphalt is higher than that of the final blend. However, it is possible to increase the softening point of the finished asphalt over that of the base by using vacuum reduced tars of which the softening points are higher than those of the base asphalt.

Applications for non-gelling cutback asphalts include their use in paints, automobile undercoatings, cements, lacquers, varnishes, japans, mastics, and for other applications where a coating with "tough and rubber-like," resilient, tenacious, elastic, and good low temperature properties are desired. The preferred composition of this invention is a three-component composition obtained by adding an aliphatic solvent to the two-component blends described. The solvent to be employed may constitute any of the petroleum solvents conventionally used in preparing cutback asphalts. Generally, the solvent constitutes a petroleum distillate fraction boiling in the general range of about 160° to 500° F. Ordinarily, a narrower boiling petroleum fraction falling within this range is employed. For example, a so-called "V. M. & P. naphtha" employed in preparing cutbacks, constitutes a straight-run naphtha boiling in the range of about 250° to 305° F. These cutback solvents can be blended with the asphalt in any desired proportions. In general, however, blends of the solvent with asphalts up to about equal weight proportions are employed. As indicated, cutback asphalts of the composition of this invention are particularly notable in exhibiting little change in viscosity over a period of time or during storage.

In order to fully disclose the nature of this invention, reference will be made to the accompanying drawing which diagrammatically illustrates the overall process for obtaining the compositions of this invention. In this drawing, a crude distillation zone 1 is depicted. A crude petroleum oil may be introduced to zone 1 through line 2.

The distillation operation is conducted to permit removal of volatile fractions overhead through line 3 and of higher boiling products such as gasoline, kerosene and heating oils through side stream withdrawals 4, 5, 6 and so on. A higher boiling fraction, boiling in the range of about 700° to 1100° F. is withdrawn as a side stream product through line 7. It is particularly contemplated that in the practice of this invention, distillation zone 1 be of such a nature as to provide a higher boiling fraction boiling in the range of about 700° to 1100° F., preferably as obtained by vacuum distillation operations, although it may be obtained from atmospheric distillation operations. Heavy residual stocks boiling above 700° F. may also be employed, if desired.

A suitable cracking feed stock of this character is conducted to a catalytic cracking zone identified by the rectangle 8. The cracking operation to be conducted in zone 8 is of any desired type employing a catalyst such as modified natural or synthetic clay or gel type catalysts. Examples of these are montmorillonite clays, silica-alumina, silica-magnesia composites, and other conventional cracking catalysts. The operation may be of a continuous or batch nature employing fixed beds, moving beds, fluidized, or suspensoid systems. The heat required for cracking may be supplied by heat exchange from the processed materials and/or as the sensible heat of exothermically regenerated catalyst, or in any other conventional manner. The cracking is carried out at temperatures of about 800° to 1000° F., and pressures of about atmospheric to 25 p. s. i. g. or higher. The total cracked products are removed from cracking zone 8 and are conducted to a product fractionator 9. Fractionator 9 is operated to remove lighter fractions of the cracked products through overhead 10, side streams 11, 12 and so on. A bottoms product is obtained from fractionator 9 which may be removed through line 14. In the event the cracking operation conducted in zone 8 is of a fluidized nature, the material withdrawn through line 14 will contain a small percentage of catalyst particles carried over from zone 8. In this case, it is necessary to pass the product stream of line 14 to a settler 15 or otherwise to process the stream to permit separation of the liquid hydrocarbon product from the catalyst. Thus, a clarified hydrocarbon stream is removed from zone 15 through line 16. For the purposes of this invention, the bottoms product of fractionator 9 corresponding to the stream of lines 14 or 16, boils above about 700° F. The stream of line 16 is generally called cycle oil. As the name suggests, cycle oil is generally recycled to the cracking zone, as heretofore virtually no other use has been found for this oil. However, it should be appreciated that return of cycle oil to the cracking operation is not particularly desirable. Cycle oil is refractory in nature and constitutes a very poor cracking feed, causing substantial deposition of carbon and coke on the catalyst employed during cracking. As will be appreciated therefore, it is one of the features of this invention to employ cycle oil so as to prevent recycling to a catalytic cracking operation and so as to provide valuable products.

As the conduct of the process described heretofore is well known to the art, no further description of this phase of the process is considered necessary. The cycle oil of line 16, derived as indicated, is then conducted to a thermal cracking zone 20. Zone 20 is employed to thermally crack the cycle oil in the conventional manner either in a once-through or recycle operation. Thus, for example, the thermal cracking zone may constitute two fired coils subjecting the cycle oil passing through to a temperature in the range between 850° and 1200° F. and to a pressure of about 300 to 1000 lbs. per square inch. The coils may be arranged in series or in parallel depending upon whether the thermally cracked stock is fed on a once-through (series) or recycle (parallel) basis. The preferred thermal cracking conditions employ coil outlet temperatures of about 900° to 1000° F., coil inlet pressures of about 650 to 750 p. s. i., and a residence time of about 3 to 6 seconds. The thermal cracking is ordinarily conducted in accordance with this invention to secure a conversion of about 24–31% for once-through operation and 15–20% for recycle operation. The heavy boiling feed is thus converted to constituents boiling below the initial boiling point of the feed.

The total products of the thermal cracking operation conducted in zone 20 are then transferred to one or more fractionation zones designated as zone 21. Light gases are removed overhead from zone 21 through line 22, while heavier distillate fractions such as gasoline, heating oil, and fuel oil, may be withdrawn from side stream withdrawals such as line 23. A heavy tar fraction may be removed from the fractionation zone as a bottoms product through line 24. The fractionation operation is preferably conducted under vacuum and should be conducted so as to provide a tar composition boiling substantially above about 700° F.

Typically, the API gravity of this material is near zero, varying for example, between —2 and 4. Its viscosity is typically between 350 and 500 SSU at 122° F. Its aromatic content varies between 70 and 100% but is normally between 80–90%.

The thermally cracked tar of line 24 may be blended with an oxidized asphalt directly or the tar may be further vacuum reduced and the bottoms blended with an oxidized asphalt. A suitable oxidized asphalt may be obtained by subjecting a residual oil to oxidation in zone 26. As formerly described, the residual oil will constitute the liquid or semi-solid residue obtained from the destructive distillation of a non-asphaltic petroleum or from the simple distillation of a semi-asphaltic or asphaltic petroleum. This residual oil will have a specific gravity @60° F. of about 0.9000–1.1000 a viscosity @ 210° F. of between 30–2000 SSF, a solubility in $CCl_4$ or $CS_2$ of 99–100%, and a Cleveland open cup flash point of 300–600° F.

The oxidation in zone 26, into which the residual oil is introduced, is preferably an air-blowing operation. To secure the desired conversion of the residual oil to an asphalt of suitable melting point, about 25 to 60 cu. ft. of air per ton of residual oil are employed. Atmospheric pressure is suitable during the air-blowing operation, and temperatures of about 400 to 600° F. are employed. This air-blowing operation is conducted to convert the residual oil to an oxidized asphalt having a softening point as determined by the ring and ball method above about 160° F. The oxidized asphalt is withdrawn through line 27 and is mixed with the thermally cracked tar of line 24. An orifice mixer 28 or other mixing means may be employed to thoroughly intermingle the oxidized asphalt and the thermal tar. The blend of oxidized asphalt and thermal tar may be removed as a product through line 29. Preferably, however, this blend is passed through an additional mixing zone such as orifice mixer 30, wherein the asphalt composition is mixed with a cutback solvent introduced through line 31. This then provides a final product from line 32 constituting a cutback asphalt of unusual properties.

In the conduct of this process about 5 to 50% by weight of the catalytically cracked, thermally cracked, vacuum reduced tar is blended with the oxidized asphalt. Within this range a proportion of about 10 to 20% of the tar material is preferably employed. These general proportions of oxidized asphalt and the tar have been found to inhibit or prevent gelling of the final asphalt composition. In preparing the cutback asphalt the petroleum solvent may be combined with the asphaltic composition in any desired proportions. Preferably, the final composition includes about 40 to 60% of the solvent.

It is presently theorized that gelling of an oxidized asphalt in a cutback asphalt composition is attributable to a deficiency of relatively low molecular weight aromatic hydrocarbons. Oxidized asphalts contain a predominance of aromatic hydrocarbons called asphaltenes having molecular weights above about 1000. Apparently, asphaltic compositions characterized by aromatic hydrocarbons rich in high molecular weight aromatics permit formation of a chain-like gel structure over a period of time. The tar material of the character described however, contains a high proportion of lower molecular weight polar aromatic hydrocarbons. It is believed that these lower molecular weight aromatic hydrocarbons are attracted to the higher molecular weight aromatic hydrocarbons so as to neutralize attractive forces between the higher molecular weight aromatic hydrocarbons, thereby preventing formation of gel structures. Whatever the mechanism, it is now known that a mixture of the catalytically cracked, thermally cracked, vacuum reduced tar with oxidized asphalts, the latter being normally subject to gelling, will prevent gelation.

The properties and benefits of the compositions of this invention are indicated by the following examples. In a first series of experiments a catalytically cracked, thermally cracked tar was blended with a high softening point oxidized asphalt. The tar employed had the following characteristics:

| | |
|---|---|
| API gravity | 3.5 |
| Viscosity, 122° F. SSF | 24.3 |
| Viscosity, 100° F. SSU | 388.5 |
| Distillation: | |
| 10% off @ 635° F. (366° F. @ 10 mm.). | |
| 50% off @ 740° F. (451° F. @ 10 mm.). | |

The oxidized asphalt employed had the following characteristics:

| | |
|---|---|
| Specific gravity @ 60° | 1.019 |
| Flash (COC), ° F. | 615 |
| Softening point (R. & B.), ° F. | 250 |
| Penetration: | |
| 77°/100 g./5" | 7 |
| 32°/200 g./60" | 5 |
| 115°/50 g./5" | 9 |

From 10 to 30% of the thermal tar was blended with the oxidized asphalt. Table I shows the softening point and penetration properties of these blends:

TABLE I

| Wt. Percent Thermally Cracked Tar | 10 | 16 | 20 | 30 |
|---|---|---|---|---|
| Softening Point (R. & B.), ° F., (glycerine) | 208 | 186 | 168 | 130 |
| Penetration, 77°/100 g./5" | 13 | 22 | 32 | 91 |

It will be seen from these data that the thermal tar lowers the softening point of the oxidized asphalt with a corresponding increase in penetration. It is of interest to note that the mixtures are compatible and that the softening point-penetration values of the blends are similar to those which would be obtained by air blowing a residual oil. In other words, it would be difficult to distinguish between the asphalts from the standpoint of susceptibility to temperature change.

A large batch of the composition just described containing 16 weight percent of thermal tar was then prepared and inspections were obtained. These inspections are shown in Table II.

TABLE II

| | 84% 235/250° F. Softening Point Asphalt+16% Thermally Cracked Tar | Typical 180/200° F. Softening Point Asphalt |
|---|---|---|
| Softening Pt. (R. & B.), ° F. | 184 | 180–200 |
| Penetration, 77°/100 g./5" | 23 | 20–30 |
| Penetration, 32°/200 g./60" | 12 | 10–20 |
| Penetration, 115°/50 g./5" | 43 | 35–75 |
| Volatility, 5 hrs., 325° F., Percent Loss | 0.5 | 0.0–0.6 |
| Penetration @ 77°, on Residue, Percent Original | 82.5 | 75–100 |
| Flash (COC), ° F. | 465 | 450–550 |

From the inspections shown in Table II, it is apparent that the blended asphalt is similar to typical 180/200° F. softening point asphalts. Therefore, the blended asphalt may be considered to be essentially the same physically as that produced by air blowing a residual oil.

The asphalt composition described constituting a blend of 16% of thermal tar with 84% of oxidized asphalt was then mixed with V. M. & P. naphtha in the weight proportion of 53% asphalt and 47% naphtha. The gelling tendency of this cutback asphalt was then determined by viscosity measurements conducted over varying periods of time. For comparative purposes, the gelling characteristics of a conventional cutback asphalt of the same grade were determined. The conventional asphalt had the following inspections:

| | |
|---|---|
| Specific gravity @ 60° F. | 1.040 |
| Flash (COC), ° F. | 580 |
| Softening point (R. & B.), ° F. | 183 |
| Penetration, 77°/100 g./5" | 24 |
| Penetration, 32°/200 g./60" | 14 |
| Penetration, 115°/50 g./5" | 49 |

The gelling properties of these asphalts are shown in Table III.

TABLE III

Gelation of cutback asphalts

[180/200° F. softening point asphalt cutback: 53 wt. percent asphalt—47 wt. percent V. M. & P. naphtha.]

| | Viscosity in Poises, 73° F. | |
|---|---|---|
| Time | 84% 235/250° F. Softening Point Asphalt+16% Thermally Cracked Tar | Typical 180/200° F. Softening Point Asphalt |
| 1 day | 7.8 | 39. |
| 2 days | 12.5 | 57. |
| 5 days | 16.5 | 66. |
| 9 days | 16.5 | 122 (10 days). |
| 16 days | 16.5 | 162 (20 days). |
| Undisturbed 30 days | 19.0 | 172. |

It will be observed from the data in Table III that the conventional cutback asphalt showed a rapid and substantial change in viscosity over the test period. However, the cutback asphalt composition of this invention showed very little change in viscosity over the test period, and after an initial two-day period, exhibited a substantially constant viscosity. These data therefore show the outstanding properties of the cutback asphalt compositions of this invention.

In another experiment the 235/250° F. softening point oxidized asphalt described previously was blended with 12 weight percent thermal tar yielding an asphalt having the following properties:

| | |
|---|---|
| Specific gravity @ 60° F. | 1.033 |
| Softening point (R. & B.), ° F. | 186 |
| Penetration, 77°/100 g./5" | 20 |
| Penetration, 32°/200 g./60" | 10 |
| Penetration, 115°/50 g./5" | 39 |

Two other 180/200° F. softening point asphalts were prepared by air blowing a residual oil. These had the following properties:

| | Asphalt A | Asphalt B |
|---|---|---|
| Specific Gravity @ 60° F. | 1.031 | 1.007 |
| Softening Point (R. & B.), ° F. | 193 | 200 |
| Penetration, 77°/100 g./5" | 26 | 22 |
| Penetration, 32°/200 g./60" | 13 | 14 |
| Penetration, 115°/50 g./5" | 45 | 37 |

50–50 weight percent mixtures of these asphalts and naphtha boiling between 250–305° F. were prepared. The gelling properties of these asphalts are shown in Table IV.

TABLE IV

Gelation of cutback asphalts

[180/220° F. softening point asphalt cutbacks: 50 wt. percent asphalt—50 wt. percent V. M. & P. naphtha.]

| Time | Viscosity in Poises, 73° F. | | |
|---|---|---|---|
| | 88% 235/250° F. Softening Point Asphalt; 12% Thermally Cracked Tar | Asphalt A | Asphalt B |
| 1 day | 4.0 | 52 | 29 |
| 4 days | 4.8 | 112 | 58 |
| 10 days | 5.2 | 195 | 103 |
| 32 days Undisturbed | 6.1 | 500+ | 185 |

The data in Table IV show that the blended cutback asphalt composition increased in viscosity very little over the test period. The conventional asphalts on the other hand, when cutback with the same naphtha as used for the blended 180/200° F. softening point asphalt, showed considerable viscosity increase coupled with a high initial 1 day viscosity. Both conventional cutback asphalts had gelled and the asphalt cutback A was a rigid, non-flowing mass.

In another experiment the thermally cracked tar obtained after prior catalytic cracking was reduced by vacuum distillation and a product having the following properties was obtained:

| | |
|---|---|
| Specific gravity @ 60° | 1.068 |
| Softening point, R. & B., ° F. | 104 |
| Penetration, 77°/100 g./5" | 105 |
| Penetration, 32°/200 g./60" | 8 |
| Furol viscosity, 210° F., sec. | 200 |
| Furol viscosity, 275° F., sec. | 29 |

This product was blended with 235/250° F., and 220/235° F. softening point asphalts. These had the following properties:

| Grade | 235/250 | 220/235 |
|---|---|---|
| Specific Gravity @ 60° | 1.008 | 1.009 |
| Softening Point | 240 | 225 |
| Penetration, 77°/100 g./5" | 8 | 10 |
| Penetration, 32°/200 g./60" | 4 | 8 |
| Penetration, 115°/50 g./5" | 15 | 27 |

Cutbacks of these asphalts gel almost immediately after preparation.

The blended asphalts had the following properties:

| Blend | 80% 235/250° F. Softening Point Asphalt+20% Vacuum Reduced Thermal Tar | 90% 220-235° F. Softening Point Asphalt+10% Vacuum Reduced Thermal Tar |
|---|---|---|
| Softening Point (R. & B.), ° F. | 186 | 192 |
| Penetration, 77°/100 g./5" | 14 | 22 |
| Penetration, 32°/200 g./60" | 8 | 12 |
| Penetration, 115°/50 g./5" | 30 | 39 |

50–50 weight percent mixtures of blended asphalts and naphtha were prepared. The gelling properties of these asphalts are shown in Table V.

TABLE V

[Gelation of 50 wt. percent asphalt—50 wt. percent naphtha cutback asphalts.]

| Blend | Viscosity in Poises, 73° F. | |
|---|---|---|
| | 80% 235/250° F. Softening Point Asphalt+20% Vacuum Reduced Thermal Tar | 90% 220-235° F. Softening Point Asphalt+10% Vacuum Reduced Thermal Tar |
| Time: | | |
| Initial | 5 | 12 |
| 4 days | 8 | 64 |
| 11 days | 8 | 78 |
| 31 days Undisturbed | 12 | 260 |

It will be noted that inclusion of 20% of vacuum reduced thermal tar prevented gelation. The viscosity increase of the cutbacks prepared from blended asphalts containing 10% vacuum reduced thermal tar was less than the corresponding increase for the conventional cutbacks prepared from 180/200° F. softening point asphalts. In addition, doubling the amount of vacuum reduced tar further decreased the tendency for the cutback to gel.

What is claimed is:

1. An asphalt process in which an oxidized asphalt having a softening point above about 160° F. is blended with a tar obtained from a petroleum feed stock boiling above about 700° F. which is subjected successively to catalytic cracking, thermal cracking and reduction.

2. The process defined by claim 1 in which the said oxidized asphalt is blended with about 5 to 50% by weight of the said tar.

3. The process defined by claim 1 in which the said tar is derived from the thermal cracking of a catalytic cycle oil boiling in the range of about 700° to 1100° F.

4. The process defined by claim 1 in which the said reduction constitutes vacuum reduction.

5. An asphalt composition constituting a mixture of about 5 to 50% of a thermal tar obtained from thermal cracking of a catalytic cycle oil with an oxidized asphalt having a softening point above about 160° F.

6. The composition defined by claim 5 including about 40 to 60 weight percent of a cutback solvent.

References Cited in the file of this patent

UNITED STATES PATENTS

| | | |
|---|---|---|
| 1,937,749 | Ebberts | Dec. 5, 1933 |
| 2,024,096 | Dengler et al. | Dec. 10, 1935 |
| 2,188,204 | Marc et al. | Jan. 23, 1940 |
| 2,542,608 | Winkler | Feb. 20, 1951 |